United States Patent
Hoffman et al.

(10) Patent No.: US 8,555,276 B2
(45) Date of Patent: Oct. 8, 2013

(54) SYSTEMS AND METHODS FOR TRANSPARENTLY OPTIMIZING WORKLOADS

(75) Inventors: Jason A. Hoffman, San Francisco, CA (US); James Duncan, Sainte-Anne-des-Lacs (CA); Mark G. Mayo, Port Moody (CA); David P. Young, San Anselmo, CA (US)

(73) Assignee: Joyent, Inc., San Francisco, CA (US)

( * ) Notice: Subject to any disclaimer, the term of this patent is extended or adjusted under 35 U.S.C. 154(b) by 29 days.

(21) Appl. No.: 13/046,647

(22) Filed: Mar. 11, 2011

(65) Prior Publication Data

US 2012/0233626 A1    Sep. 13, 2012

(51) Int. Cl.
G06F 9/45 (2006.01)
G06F 9/455 (2006.01)
G06F 15/16 (2006.01)
G06F 15/173 (2006.01)

(52) U.S. Cl.
USPC ............ 718/1; 718/100; 718/102; 718/103; 718/104; 718/105; 709/201; 709/223; 709/224; 709/226

(58) Field of Classification Search
None
See application file for complete search history.

(56) References Cited

U.S. PATENT DOCUMENTS

| | | | |
|---|---|---|---|
| 7,222,345 B2 | 5/2007 | Gray et al. | |
| 7,265,754 B2 | 9/2007 | Brauss | |
| 7,379,994 B2 | 5/2008 | Collazo | |
| 7,437,730 B2 | 10/2008 | Goyal | |
| 7,640,547 B2 | 12/2009 | Neiman et al. | |
| 7,774,457 B1 | 8/2010 | Talwar et al. | |
| 7,904,540 B2 | 3/2011 | Hadad et al. | |
| 7,917,599 B1 | 3/2011 | Gopalan et al. | |
| 7,940,271 B2 | 5/2011 | Wright et al. | |
| 8,141,090 B1 | 3/2012 | Graupner et al. | |
| 8,301,746 B2 * | 10/2012 | Head et al. | 709/223 |
| 8,429,282 B1 | 4/2013 | Ahuja et al. | |
| 2002/0082856 A1 | 6/2002 | Gray et al. | |
| 2002/0198995 A1 | 12/2002 | Liu et al. | |
| 2003/0154112 A1 | 8/2003 | Neiman et al. | |
| 2005/0108712 A1 | 5/2005 | Goyal | |
| 2005/0188075 A1 | 8/2005 | Dias et al. | |
| 2006/0107087 A1 | 5/2006 | Sieroka et al. | |

(Continued)

FOREIGN PATENT DOCUMENTS

WO    WO2011088224    7/2011

OTHER PUBLICATIONS

Yagoubi, Belabbas et al., "Load Balancing in Grid Computing," Asian Journal of Information Technology, vol. 5, No. 10, pp. 1095-1103, 2006. (Joyent_NPL0001).

(Continued)

Primary Examiner — Emerson Puente
Assistant Examiner — Charles Swift
(74) Attorney, Agent, or Firm — Carr & Ferrell LLP (57) ABSTRACT

Systems, methods, and media for transparently optimizing a workload of a containment abstraction are provided herein. Methods may include monitoring a workload of the containment abstraction, the containment abstraction being at least partially hardware bound, the workload corresponding to resource utilization of the containment abstraction, converting the containment abstraction from being at least partially hardware bound to being entirely central processing unit (CPU) bound by placing the containment abstraction in a memory store, based upon the workload, and allocating the workload of the containment abstraction across at least a portion of a data center to optimize the workload of the containment abstraction.

28 Claims, 4 Drawing Sheets

(56) References Cited

U.S. PATENT DOCUMENTS

| | | | |
|---|---|---|---|
| 2006/0153174 A1 | 7/2006 | Towns-von Stauber et al. | |
| 2006/0218285 A1 | 9/2006 | Talwar et al. | |
| 2007/0088703 A1 | 4/2007 | Kasiolas et al. | |
| 2007/0118653 A1 | 5/2007 | Bindal | |
| 2007/0250838 A1 | 10/2007 | Belady et al. | |
| 2007/0271570 A1 | 11/2007 | Brown et al. | |
| 2008/0080396 A1 | 4/2008 | Meijer et al. | |
| 2008/0103861 A1 | 5/2008 | Zhong | |
| 2008/0155110 A1 | 6/2008 | Morris | |
| 2009/0077235 A1 | 3/2009 | Podila | |
| 2009/0164990 A1 | 6/2009 | Ben-Yehuda et al. | |
| 2009/0193410 A1 | 7/2009 | Arthursson et al. | |
| 2009/0216910 A1 | 8/2009 | Duchesneau | |
| 2009/0259345 A1 | 10/2009 | Kato et al. | |
| 2009/0260007 A1 | 10/2009 | Beaty et al. | |
| 2009/0300210 A1* | 12/2009 | Ferris | 709/235 |
| 2010/0050172 A1* | 2/2010 | Ferris | 718/1 |
| 2010/0057913 A1 | 3/2010 | DeHaan | |
| 2010/0106820 A1 | 4/2010 | Gulati et al. | |
| 2010/0125845 A1 | 5/2010 | Sugumar et al. | |
| 2010/0131324 A1 | 5/2010 | Ferris | |
| 2010/0162259 A1 | 6/2010 | Koh et al. | |
| 2010/0223383 A1 | 9/2010 | Salevan et al. | |
| 2010/0223385 A1 | 9/2010 | Gulley et al. | |
| 2010/0235632 A1 | 9/2010 | Iyengar et al. | |
| 2010/0250744 A1 | 9/2010 | Hadad et al. | |
| 2010/0262752 A1 | 10/2010 | Davis et al. | |
| 2010/0299313 A1 | 11/2010 | Orsini et al. | |
| 2010/0306765 A1* | 12/2010 | DeHaan | 718/1 |
| 2010/0306767 A1 | 12/2010 | DeHaan | |
| 2010/0318609 A1* | 12/2010 | Lahiri et al. | 709/205 |
| 2010/0332629 A1 | 12/2010 | Cotugno et al. | |
| 2010/0333087 A1 | 12/2010 | Vaidyanathan et al. | |
| 2011/0016214 A1* | 1/2011 | Jackson | 709/226 |
| 2011/0029969 A1 | 2/2011 | Venkataraja et al. | |
| 2011/0047315 A1 | 2/2011 | De Dinechin et al. | |
| 2011/0055396 A1* | 3/2011 | DeHaan | 709/226 |
| 2011/0078303 A1* | 3/2011 | Li et al. | 709/224 |
| 2011/0107332 A1 | 5/2011 | Bash | |
| 2011/0131306 A1 | 6/2011 | Ferris et al. | |
| 2011/0131329 A1* | 6/2011 | Kaplinger et al. | 709/226 |
| 2011/0131589 A1 | 6/2011 | Beaty et al. | |
| 2011/0138382 A1 | 6/2011 | Hauser et al. | |
| 2011/0145392 A1* | 6/2011 | Dawson et al. | 709/224 |
| 2011/0153724 A1 | 6/2011 | Raja et al. | |
| 2011/0161952 A1 | 6/2011 | Poddar et al. | |
| 2011/0173470 A1 | 7/2011 | Tran | |
| 2011/0179132 A1 | 7/2011 | Mayo et al. | |
| 2011/0179134 A1 | 7/2011 | Mayo et al. | |
| 2011/0179162 A1 | 7/2011 | Mayo et al. | |
| 2011/0185063 A1* | 7/2011 | Head et al. | 709/226 |
| 2011/0219372 A1* | 9/2011 | Agrawal et al. | 718/1 |
| 2011/0270968 A1* | 11/2011 | Salsburg et al. | 709/224 |
| 2011/0276951 A1* | 11/2011 | Jain | 717/140 |
| 2011/0296021 A1 | 12/2011 | Dorai et al. | |
| 2011/0320520 A1* | 12/2011 | Jain | 709/203 |
| 2012/0017210 A1* | 1/2012 | Huggins et al. | 718/1 |
| 2012/0066682 A1* | 3/2012 | Al-Aziz et al. | 718/100 |
| 2012/0131591 A1* | 5/2012 | Moorthi et al. | 718/104 |
| 2012/0167081 A1* | 6/2012 | Sedayao et al. | 718/1 |
| 2012/0173709 A1* | 7/2012 | Li et al. | 709/224 |
| 2012/0179874 A1* | 7/2012 | Chang et al. | 711/128 |
| 2012/0204176 A1* | 8/2012 | Tian et al. | 718/1 |
| 2012/0221845 A1* | 8/2012 | Ferris | 713/150 |
| 2012/0311012 A1* | 12/2012 | Mazhar et al. | 709/201 |
| 2013/0129068 A1 | 5/2013 | Lawson et al. | |
| 2013/0132057 A1 | 5/2013 | Deng et al. | |

OTHER PUBLICATIONS

Kramer, "Advanced Message Queuing Protocol (AMQP)," Linux Journal, Nov. 2009, p. 1-3.

Subramoni et al., "Design and Evaluation of Benchmarks for Financial Applications Using Advanced Message Queuing Protocol (AMQP) over InfiniBand," Nov. 2008.

Richardson et al., "Introduction to RabbitMQ," Sep. 2008, p. 1-33.

Bernstein et al., "Using XMPP as a Transport in Intercloud Protocols," Jun. 22, 2010, p. 1-8.

Bernstein et al., "Blueprint for the Intercloud—Protocols and Formats for Cloud Computing Interoperabiilty," May 28, 2009, p. 328-336.

Gregg, Brendan, "Visualizing System Latency," May 1, 2010, ACM Queue, p. 1-13, http://queue.acm.org/detail.cfm?id=1809426.

Gregg, Brendan, "Heat Map Analytics," Mar. 17, 2009, Oracle, p. 1-7, https://blogs.oracle.com/brendan/entry/heat_map_analytics.

Mundigl, Robert, "There is More Than One Way to Heat a Map," Feb. 10, 2009, Clearly and Simply, p. 1-12, http://www.clearlyandsimply.com/clearly_and_simply/2009/02/there-is-more-than-one-way-to-heat-a-map.html.

U.S. Appl. No. 13/046,660, filed Mar. 11, 2011, Jason A. Hoffman, Systems and Methods for Sizing Resources in a Cloud-Based Environment.

Bi et al. "Dynamic Provisioning Modeling for Virtualized Multi-tier Applications in Cloud Data Center". 2010 IEEE 3rd International Conference on Cloud Computing. pp. 370-377.

Chappell, David. "Introducing Windows Azure". Microsoft Corporation. Oct. 2010. pp. 1-25.

* cited by examiner

SYSTEMS AND METHODS FOR TRANSPARENTLY OPTIMIZING WORKLOADS

CROSS-REFERENCE TO RELATED APPLICATIONS

This nonprovisional patent application is related to U.S. patent application Ser. No. 12/696,334, filed on Jan. 29, 2010, entitled "MANAGING WORKLOADS AND HARDWARE RESOURCES IN A CLOUD RESOURCE," to U.S. patent application Ser. No. 12/696,619 filed on Jan. 29, 2010, entitled "PROVISIONING SERVER RESOURCES IN A CLOUD RESOURCE," to U.S. patent application Ser. No. 12/696,802, filed on Jan. 29, 2010, entitled "MANAGING HARDWARE RESOURCES BY SENDING MESSAGES AMONGST SERVERS IN A DATA CENTER," to U.S. Provisional Patent Application No. 61/295,375, filed on Jan. 15, 2010, entitled "MANAGING WORKLOADS AND HARDWARE RESOURCES IN A CLOUD RESOURCE," and PCT Patent Application No. PCT/US2011/021157 filed on Jan. 13, 2011, entitled "MANAGING WORKLOADS AND HARDWARE RESOURCES IN A CLOUD RESOURCE"—all of which are hereby incorporated by reference herein in their entirety including all references cited therein.

FIELD OF THE INVENTION

The present technology relates generally to transparently optimizing workloads, and more specifically, but not by way of limitation, to systems and methods for transparently optimizing workloads of containment abstractions within cloud computing systems.

BACKGROUND

A cloud is a resource that typically combines the computational power of a large grouping of processors and/or that combines the storage capacity of a large grouping of computer memories or storage devices. For example, systems that provide a cloud resource may be utilized exclusively by their owners, such as Google or Yahoo!, or such systems may be accessible to outside users who deploy applications within the computing infrastructure to obtain the benefit of large computational or storage resources. The cloud may be formed, for example, by a network of servers with each server providing processor and/or storage resources.

SUMMARY OF THE INVENTION

According to some embodiments, the present technology may be directed to methods for transparently optimizing a workload of a containment abstraction by: (a) determining if an at least partially hardware bound containment abstraction should be converted to an entirely central processing unit (CPU) bound containment abstraction based upon the workload of the at least partially hardware bound containment abstraction; (b) converting the at least partially hardware bound containment abstraction to being an entirely (CPU) bound containment abstraction by placing the containment abstraction in a memory store, based upon the workload; and (c) allocating the workload of the entirely CPU bound containment abstraction across at least a portion of a data center to optimize the workload of the entirely CPU bound containment abstraction.

According to other embodiments, the present technology may be directed to systems for transparently optimizing a workload of a containment abstraction that include: (a) a memory for storing executable instructions for transparently optimizing a performance of a containment abstraction; and (b) a processor configured to execute the instructions stored in the memory to: (i) determine if an at least partially hardware bound containment abstraction should be converted to an entirely central processing unit (CPU) bound containment abstraction based upon the workload of the at least partially hardware bound containment abstraction; (ii) convert the at least partially hardware bound containment abstraction to being an entirely (CPU) bound containment abstraction by placing the containment abstraction in a memory store, based upon the workload; and (iii) allocate the workload of the entirely CPU bound containment abstraction across at least a portion of a data center to optimize the workload of the entirely CPU bound containment abstraction.

According to additional embodiments, the present technology may be directed to methods for transparently converting asynchronous output of a containment abstraction to synchronous output by: (a) determining if the asynchronous output of the containment abstraction indicates that the containment abstraction is busy, the containment abstraction being at least partially hardware bound; (b) responsive to determining, converting the containment abstraction from being at least partially hardware bound to being entirely central processing unit (CPU) bound by placing the containment abstraction in a memory store; (c) aggregating the asynchronous output of the entirely CPU bound containment abstraction; and (c) synchronously providing the aggregated asynchronous output to a data store.

According to some embodiments, the present technology may be directed to methods for transparently optimizing a workload of a containment abstraction by: (a) determining if an at least partially hardware bound containment abstraction should be converted to an entirely central processing unit (CPU) bound containment abstraction based upon the workload of the at least partially hardware bound containment abstraction; (b) placing the at least partially hardware bound containment abstraction into a storage object and moving the storage object to a memory store to convert the at least partially hardware bound containment abstraction to being entirely (CPU) bound containment abstraction, based upon the workload; and (c) arbitraging the workload of the entirely CPU bound containment abstraction to a data center to optimize the workload of the entirely CPU bound containment abstraction.

DETAILED DESCRIPTION OF EXEMPLARY EMBODIMENTS

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

Broadly speaking, the systems and methods of the present invention may be directed to transparently optimizing workloads. More specifically, the systems and methods may be adapted to transparently optimize the workloads of a plurality of containment abstractions that operate within a cloud computing system.

As stated previously, a cloud is a resource that typically combines the computational power of a large grouping of processors and/or that combines the storage capacity of a large grouping of computer memories or storage devices. For example, systems that provide a cloud resource may be utilized exclusively by their owners, such as Google or Yahoo!, or such systems may be accessible to outside users who deploy applications within the computing infrastructure to obtain the benefit of large computational or storage resources.

The cloud may be formed, for example, by a network of servers with each server providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The term "containment abstraction" may be understood to include an abstraction of a computing environment, such as an operating system. Common containment abstractions include, but are not limited to, containers and associated file systems, virtual machines, applications, programs, operating system virtualizations, virtual environments, jails, virtual private servers, and other abstractions of computing environments that would be known to one of ordinary skill in the art with the present disclosure before them. In some specific examples, a containment abstraction may include a virtual machine and the file system utilized by the virtual machine.

It will be understood that containment abstractions may be implemented in the context of the cloud such that the containment abstractions utilize the shared compute resources of the cloud. That is, each of the plurality of servers dedicates their individual compute resources to the workloads of the individual containment abstractions. Stated otherwise, the compute power of the plurality exceeds the compute power of the individual servers alone. Moreover, workloads may be balanced across the plurality of servers based upon their respective workload. The systems and methods may select which of the plurality of servers are utilized based upon their respective workloads. For example, only servers that have a current minimal workload may be selected to share their compute resources.

It is noteworthy that an end user may utilize the containment abstraction in the same way that the end user would utilize an entirely physical computing structure (computing system, server, etc.) with an operating system and ancillary applications, with the added benefit of the shared compute resources of the cloud, rather than the limited hardware capabilities of a single physical computing structure.

Typically, a containment abstraction is allocated compute resources from the cloud based upon an expected workload of the containment abstraction. Containment abstractions with higher expected workloads may be allocated more resources.

Moreover, the systems and methods provided herein are adapted to facilitate multi-tenancy of containment abstractions for a plurality of end users. That is, a plurality of containment abstractions may be "virtualized" and reside with the cloud such that the plurality of containment abstractions utilize the compute resources of the cloud.

The term "workload" may be understood to include the amount of processing that a containment abstraction has been given to perform over a given period of time. In addition to processing, the workload of a containment abstraction may be understood to include certain measurements of latency and bandwidth. Latency may include time-based metrics (e.g., time delay experienced by an end user of the containment abstraction) of the containment abstraction while bandwidth may include measurable I/O metrics for a variety of data communications of a containment abstraction such as disk I/O, memory I/O, and network I/O. The workload may consist of one or more applications that are executed in the containment abstraction and a number of end users that are connected to and interacting with the one or more applications.

The expected workload of a containment abstraction may be utilized as a benchmark to evaluate the performance of the containment abstraction. With regard to cloud computing, the performance of the containment abstraction may be understood to include the ability of the compute resources allocated to the containment abstraction to perform the workload relative to an acceptable response time or a desired throughput (e.g., the amount of data that the containment abstraction is expected to process) of the containment abstraction.

Unfortunately, periodic or extended increases in workload may deleteriously affect the performance of the containment abstraction because the allocated resources may be insufficient to handle the increased workload. Such increases in workload may lead to poor performance of the containment abstraction. For example, if the containment abstraction includes a virtual server that provides web content, excessive requests for the web content may result in a higher workload demand for the containment abstraction relative to the expected workload of the containment abstraction. As such, end users (e.g., content viewers) may notice significant delays caused by the inability of the allocated compute resources to process the increased workload.

While allocating additional compute resources to the containment abstraction may obviate performance issues, when the workload decreases the additional compute resources that have been allocated to the containment abstraction may sit idle, as these additional compute resources are bound to the containment abstraction and are no longer needed. Because the additional compute resources have been bound to the containment abstraction, they are unavailable to other containment abstractions, which may actually need the additional compute resources. Moreover, end users that implement the containment abstraction are charged based upon the compute resources that are allocated to the end users. Therefore, once the additional compute resources have been allocated, the end users are required to pay for the use of the additional compute resources, even when the workload of the containment abstraction decreases.

The systems and methods of the present technology remedy these drawbacks and deficiencies associated with allocation of compute resources of common cloud computing systems.

Figure 1:
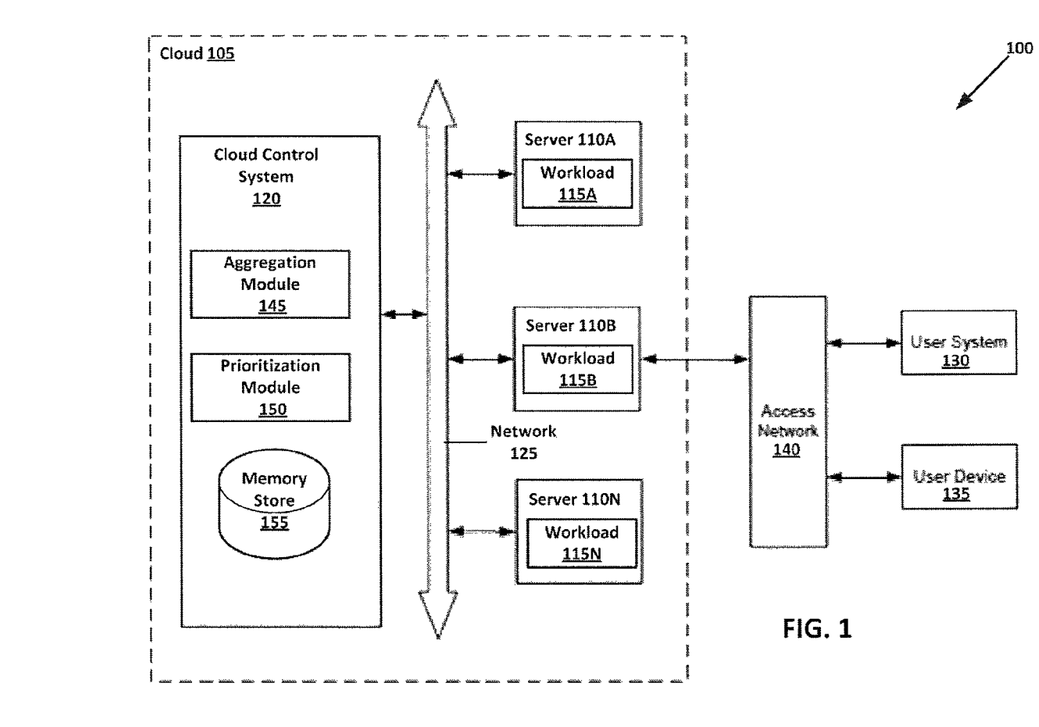
FIG. 1 illustrates an exemplary cloud system for practicing aspects of the present technology.

FIG. 1 illustrates an exemplary cloud system 100 for practicing aspects of the present technology. The system 100 is shown as including a "data center" or cloud 105 including servers 110A, 110B, and 110N (cloud 105 may include any number of servers), and a cloud control system 120 according to one embodiment. Cloud 105 manages the hardware resources (e.g., processor, memory, and/or storage space) of servers 110A-N coupled by network 125 (e.g., a local-area or other data network) or otherwise.

Customers or users of cloud 105 may access the services of the cloud 105 via a user system 130 (e.g., a website server) or user device 135 (e.g., a phone or PDA) running an application program interface (API). User system 130 and user device 135 communicatively couple to the cloud 105 using an access network 140 (e.g., the Internet or other telecommunications network). Access network 140 may communicate, for example, directly with server 110A or with another computing device in cloud control system 120. It will be understood that the user system 130 and user device 135 may be generally described with reference to computing system 400, as described in greater detail with reference to FIG. 4.

Each of many potential customers (e.g., hundreds or thousands) may configure one or more containment abstractions to run in cloud 105. Each containment abstraction runs one or many processing workloads of a customer (e.g., serving of a website, etc.), which places processing and other demands on the compute resources of cloud 105. For example, server 110A handles processing for a workload 115A, server 110B handles processing for a workload 115B . . . and server 110N handles processing for a workload 115N, as illustrated in FIG. 1.

For example, a user may access cloud 105 by going to a website and ordering a containment abstraction, which is then provisioned by cloud control system 120. Then, the user has a private API that exists on all of their services. This will be made public to the customers of the user, and the user can use an API to interact with the infrastructure. Every system may have a "public" interface, a private interface, an administrative interface and a storage interface. This is reflected, for example, from switch to port to NIC to physical interface to logical interface to virtual interface.

Generally speaking the cloud control system 120 may be adapted to determine if an at least partially hardware bound containment abstraction should be converted to an entirely central processing unit (CPU) bound containment abstraction based upon the workload of the at least partially hardware bound containment abstraction. If the containment abstraction is to be converted, the cloud control system 120 may convert the at least partially hardware bound containment abstraction to being an entirely (CPU) bound containment abstraction by placing the containment abstraction in a memory store, based upon the workload. Next, the cloud control system 120 may allocate the workload of the entirely CPU bound containment abstraction across at least a portion of a data center to optimize the workload of the entirely CPU bound containment abstraction. Finally, the cloud control system 120 may revert the entirely CPU bound containment abstraction back to an at least partially hardware bound state.

As such, the cloud control system 120 is adapted to transparently optimize the workloads of a plurality of containment abstractions contained within the cloud (multi-tenancy) within the context of entirely "virtualized" processes. That is, because the containment abstractions exist as "virtual" entities within the cloud, all operations performed on the containment abstractions within the cloud are virtualized.

For example, even the memory store into which the containment abstractions are placed are virtualized (e.g., a virtual memory store). That is, the memory store (once loaded with a containment abstraction) is virtualized, end user specific (dependent upon the needs of the end user), and sensitive to the dynamic workload of the containment abstraction (e.g., latency, performance, etc.), as will be discussed in greater detail below. Stated otherwise, the in-memory cache itself is virtualized, customer-aware, and latency-aware.

In some embodiments, the system begins in multi-tenancy cloud computing and stays within multi-tenancy cloud computing after virtual caching.

It will be understood that "end user specific" may include customer desires, quality of service requests, service latency requirements, economic considerations of the customer as well as the cloud administrators. Therefore, the virtualized memory includes a system-latency aware.

In addition, when the cloud control system 120 reverts the entirely CPU bound containment abstraction back to an at least partially hardware bound state, the reverted containment abstraction is also in a virtualized state.

In short, the containment abstractions remain in a virtualized state during all processes performed on the containment abstractions within the cloud 105.

Each containment abstraction uses a portion of the hardware resources of cloud 105. These hardware resources include storage and processing resources distributed onto each of the plurality of servers, and these resources are provisioned to handle the containment abstraction as minimally specified by a user. Cloud control system 120 dynamically provisions the hardware resources of the servers in the cloud 105 during operation as the cloud 105 handles varying customer workload demands. Cloud control system 120 may be implemented on many different types of computing devices, such as dedicated hardware platform(s) and/or distributed across many physical nodes. Some of these physical nodes may include, for example, one or more of the servers 110A-N or other servers in cloud 105.

A typical workload of a containment abstraction includes the production of asynchronous I/O. For example, if the containment abstraction is a database program, the containment abstraction may routinely output data to a storage disk associated with one of the servers 110A-N of the cloud 105. This type of randomized data output is commonly referred to as asynchronous output. Containment abstractions that generate asynchronous output may be referred to as being at least partially hardware bound because they require their output data to be written to a physical disk. Therefore, the reliance of the containment abstraction on the performance of the physical disk creates a limiting condition on the performance of the containment abstraction.

As such, containment abstractions that are at least partially hardware bound (i.e., create asynchronous data output) are less efficient than containment abstractions that are memory or central processing unit (CPU) bound. That is, the only performance limiting condition on an entirely CPU bound containment abstraction is CPU processing resources dedicated to the containment abstraction. Because the cloud 105 may allocate CPU resources as necessary, this limiting condition may be easily overcome relative to limiting conditions associated with physical hardware (e.g., storage devices). Physical limitations may be difficult to overcome due to certain physical constraints of physical systems. Stated otherwise, CPU resources are infinitely expandable whereas physical resources are constrained by the physical properties or behaviors of the physical resources (e.g., disk speed, etc.).

Therefore, in addition to dynamically provisioning the hardware resources of the servers 110A-N in the cloud 105, the cloud control system 120 may further be adapted to convert containment abstractions that are at least partially hardware bound to being entirely CPU bound. The cloud control system 120 may convert the containment abstraction by placing the containment abstraction in a storage object that may be cached in memory of one of the servers 110A-N of the cloud.

The terms "storage object" may be most generally described as a virtual entity for grouping data together that has been determined by an end user to be logically related. Therefore, a storage object may include a containment abstraction or a plurality of logically related containment abstractions (e.g., related programs in a program suite or platform).

The cloud control system 120 may determine which of the containment abstractions should be converted by monitoring the workload of the containment abstraction to determine when the containment abstraction is "busy." It will be understood that the cloud control system 120 may recognize the containment abstraction as "busy" when the workload of the containment abstraction exceeds an expected workload for the containment abstraction. In additional embodiments, the containment abstraction may be required to exceed the expected workload for a period of time. Also, a containment abstraction may be determined to be busy when the containment abstraction produces a predetermined amount of asynchronous output (e.g., random output to a physical disk).

Once a containment abstraction is determined to be busy, the cloud control system 120 may place the containment abstraction in a storage object. The cloud control system 120 may move the storage object to a memory store 155 that is associated with, for example, the server 110A, via cloud 105. In other embodiments, the storage object may be moved to the memory store (not shown) of any server 110A within cloud 105 or may be distributed across memory stores of a plurality of servers. The action of moving the storage object that includes the containment abstraction into the memory store 155 converts the containment abstraction to being entirely CPU bound.

It will be understood that the process of placing the containment abstraction into a storage object and converting the containment abstraction from being at least partially hardware bound to being entirely CPU bound may be performed transparently to the end user. That is, the end user experiences no discernable decrease in the performance of the containment abstraction, and may, in fact, realize an increase in performance as the workload of the containment abstraction is allocated across the CPU resources of the cloud 105. Further details regarding the allocation of CPU resources are described in greater detail with reference to U.S. patent application Ser. No. 12/696,334, filed on Jan. 29, 2010, entitled "Managing Workloads and Hardware Resources in a Cloud Resource" which is hereby incorporated by reference herein in its entirety including all reference cited therein.

As such, once the containment abstraction is "memory" or CPU bound, the cloud control system 120 may allocate CPU resources from the cloud 105 to process the workload of the containment abstraction. The act of allocating CPU resources may also be referred to as arbitraging CPU resources. That is, the cloud control system 120 may leverage unused CPU resources of the cloud 105 to process the workload of the containment abstraction.

During operation, the containment abstraction continues to generate output just as it did when it was at least partially hardware bound. Because the containment abstraction is CPU bound in memory, rather than the generated output of the containment abstraction being communicated to a physical storage medium (e.g., a storage disk), the random or asynchronous output of the containment abstraction may be aggregated by an aggregation module 145. Aggregated asynchronous output may be provided to a physical storage medium in batches, rather than singular transaction. For example, a containment abstraction that abstracts a database program generates output such as updates to the database each time an end user inputs data. Because end users may constantly input data during a containment abstraction session, the input data is asynchronously written to the database that exists on a physical disk. Rather than writing data to the disk for each transaction, the aggregation module 145 may aggregate the data output together for the containment abstraction session and push the aggregated data output to the physical disk at the end of the containment abstraction session.

Pushing aggregated data output to the physical disk in batches may be referred to as synchronously outputting data to the physical disk. Aggregating asynchronous output and delivering the aggregated data synchronously improves the performance of the containment abstraction.

In additional embodiments, the cloud 105 may utilize a prioritization module 150 that is adapted to determine the amount of CPU resources of cloud 105 that are allocated to a particular containment abstraction based upon one or more factors, such as an importance of the containment abstraction relative to other containment abstractions operating the cloud 105 and a magnitude of the workflow of a containment abstraction. It will be understood that the functionality of the prioritization module 150 may be implemented in addition to the ability of the cloud control system 120 to allocate cloud 105 resources. For example, servers already tasked with providing CPU resources to other containment abstractions of the same or greater importance may not be immediately selected by the cloud control system 120.

Therefore, in some embodiments, the cloud control system 120 may first determine the workload of a containment abstraction. The cloud control system 120 may be adapted to determine if the workload of the containment abstraction meets or exceeds an expected workload for the containment abstraction. Details regarding the expected workload may be established by cloud administrators (individuals tasked with creating and implementing workload policies for the cloud 105). In other embodiments, the containment abstraction users, via their user system 130, may establish the expected workload for the containment abstraction.

Upon meeting or exceeding the expected workload (also known as a conversion event), the prioritization module 150 may be adapted to determine if the containment abstraction should be converted from being at least partially hardware bound to being entirely CPU bound. If the prioritization module 150 determines that the containment abstraction should be converted, the cloud control system 120 converts the containment abstraction from being at least partially hardware bound to being entirely CPU bound.

Upon determining that the containment abstraction is no longer eligible to be entirely CPU bound, or upon determining that the workload of the entirely CPU bound containment abstraction has fallen below the expected workload for the containment abstraction (also known as a reversion event), the cloud control system 120 may revert containment abstraction from being entirely CPU bound to being at least partially hardware bound again. Again, the prioritization module 150 may determine that the containment abstraction is no longer eligible to be entirely CPU bound by comparing the relative priority of the containment abstraction to the priority of other containment abstractions to determine if one or more of the other containment abstractions should be CPU bound instead of the instant containment abstraction.

In additional embodiments, the prioritization module 150 may automatically reverted back an entirely CPU bound containment abstraction to being at least partially hardware bound when another containment abstraction having a higher priority is determined to require conversion.

Likewise the cloud control system 120 may prioritize the allocation of resources as described above based upon the relative priority of already CPU bound containment abstractions in the cloud 105.

It will be understood that the cloud control system 120 and prioritization module 150 may utilize statistical analyses of the workload of containment abstractions gathered by the cloud control system 120 over a given period of time. Moreover, prioritization may be predicated upon subjective data received from cloud administrators. For example, the cloud administrators may establish information for ranking one containment abstraction above another containment abstraction based upon the size of the containment abstraction user (e.g., how many containment abstractions they purchase, how often they utilize their containment abstractions, and so forth).

Figure 2:
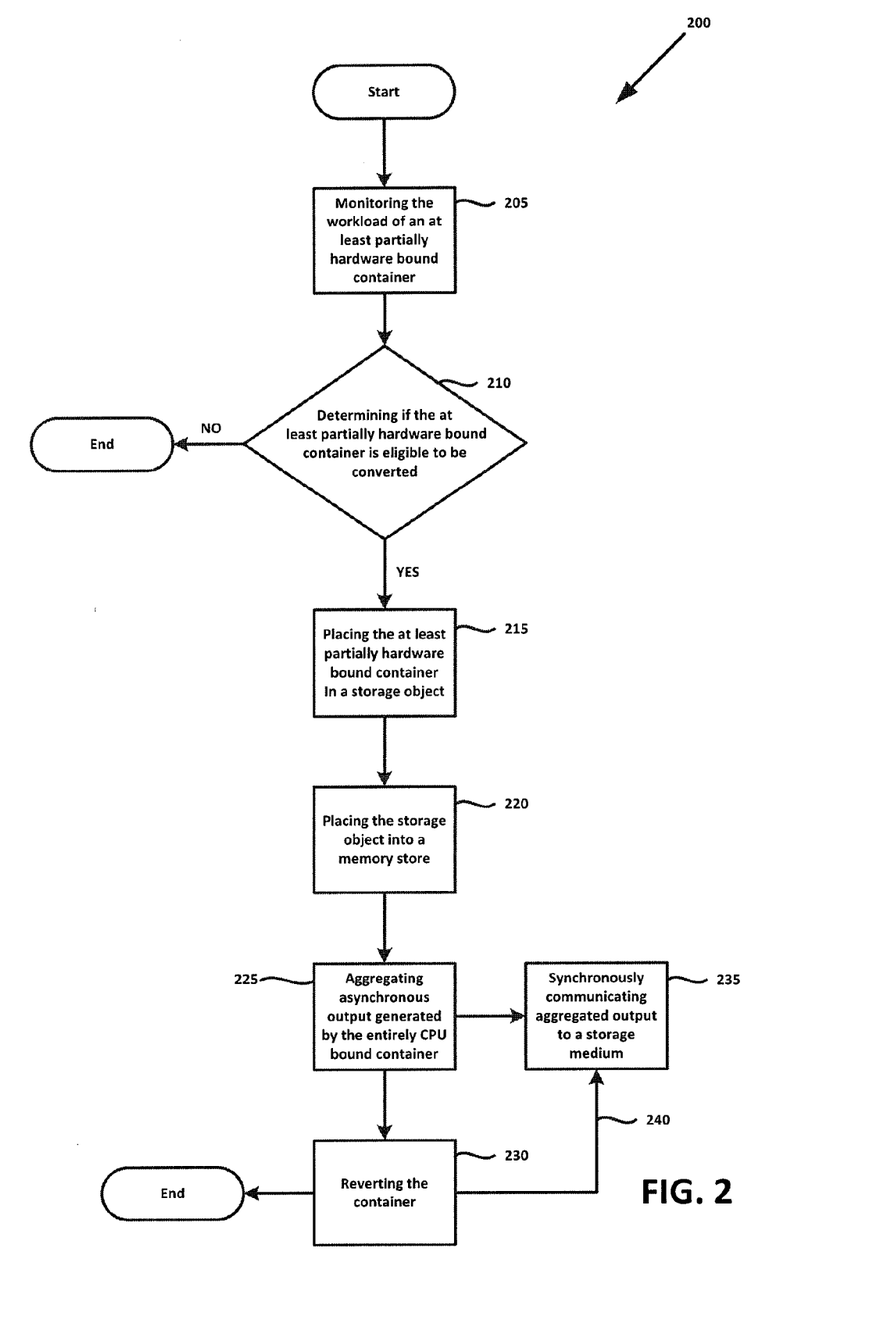
FIG. 2 illustrates an exemplary flow diagram of a method for transparently optimizing workloads.

Referring now to FIG. 2, an exemplary flow chart of a method 200 for transparently optimizing workloads is provided. The method 200 may include a step 205 of monitoring the workload of an at least partially hardware bound containment abstraction that exists on a server within a cloud computing system. If the workload of the containment abstraction meets or exceeds an expected workload amount established for the containment abstraction (e.g., a conversion event), the method 200 may include the step 210 of determining if the containment abstraction is eligible to be converted from being at least partially hardware bound to being entirely CPU bound.

The step 210 may include comparing the workloads of a plurality of containment abstractions to one another to determine the relative workload of the containment abstraction, or may include a statistical analysis or subjective analysis of the importance of containment abstractions relative to one another. If the containment abstraction is eligible to be converted, the method 200 may include the step 215 of placing the containment abstraction in a storage object. If the containment abstraction is not eligible to be converted, the containment abstraction remains the at least partially bound to hardware.

Next, the method 200 may include the step 220 of placing (e.g., caching) the storage object that includes the containment abstraction in a memory store to convert the containment abstraction from being at least partially hardware bound to being entirely CPU bound. Again, the storage object may be distributed across memory stores of a plurality of servers within the cloud.

After the storage object has been converted to being completely CPU bound, the method 200 may include the step 225 of aggregating asynchronous output generated by the entirely CPU bound containment abstraction.

The system continues to monitor the workload of the entirely CPU bound containment abstraction to determine if the workload of the entirely CPU bound containment abstraction falls below the expected workload amount (e.g., a reversion event). This may include the workload of the containment abstraction staying at or below the expected workload amount for a period of time. If the workload of the entirely CPU bound containment abstraction falls below the expected workload amount, the method may include the step of 230 reverting the containment abstraction (e.g., the containment abstraction in the storage object) from being entirely CPU bound to being at least partially hardware bound.

The aggregated asynchronous data gathered during the step 225 may be synchronously communicated to a storage device (e.g., disk storage) of a server in step 235, after the step 230 of reverting the containment abstraction. Also, aggregated asynchronous data may be periodically aggregated and synchronously communicated while the containment abstraction is entirely CPU bound, as indicated by line 240.

Figure 3:
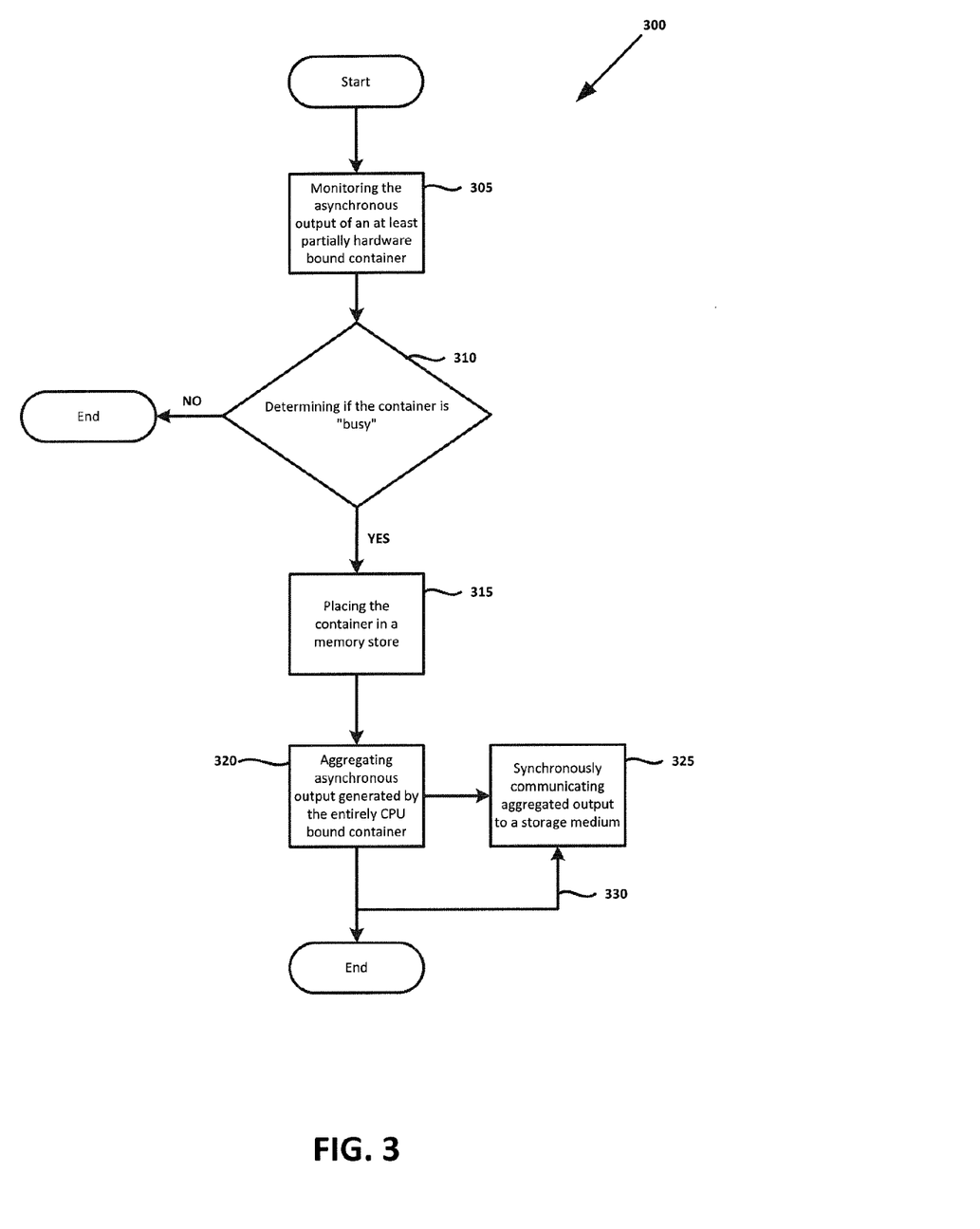
FIG. 3 is an exemplary flow diagram of a method for transparently converting asynchronous output of a containment abstraction to synchronous output.

FIG. 3 illustrates an exemplary flow chart of a method 300 for transparently converting asynchronous output of a containment abstraction to synchronous output. The method 300 may be initiated by a step 305 of monitoring the asynchronous output of an at least partially hardware bound containment abstraction. If the system determines that the asynchronous output of the containment abstraction indicates that the containment abstraction is not "busy," then the method 300 ends. On the other hand, if the system determines that the asynchronous output of the containment abstraction indicates that the containment abstraction is "busy" (e.g., outputting a relatively high amount of asynchronous output) in step 310, the method may include the step 315 of converting the containment abstraction from being at least partially hardware bound to being entirely central processing unit (CPU) bound by placing the containment abstraction in a memory store of, for example, a server.

The method 300 may include the step of 320 aggregating the asynchronous output of the entirely CPU bound containment abstraction and the step 325 of synchronously providing the aggregated asynchronous output to a data store. It will be understood that the step 320 may occur when the containment abstraction is CPU bound, or may occur upon the occurrence of a reversion event when the containment abstraction is reverted back to being at least partially hardware bound, as shown by line 330.

Figure 4:
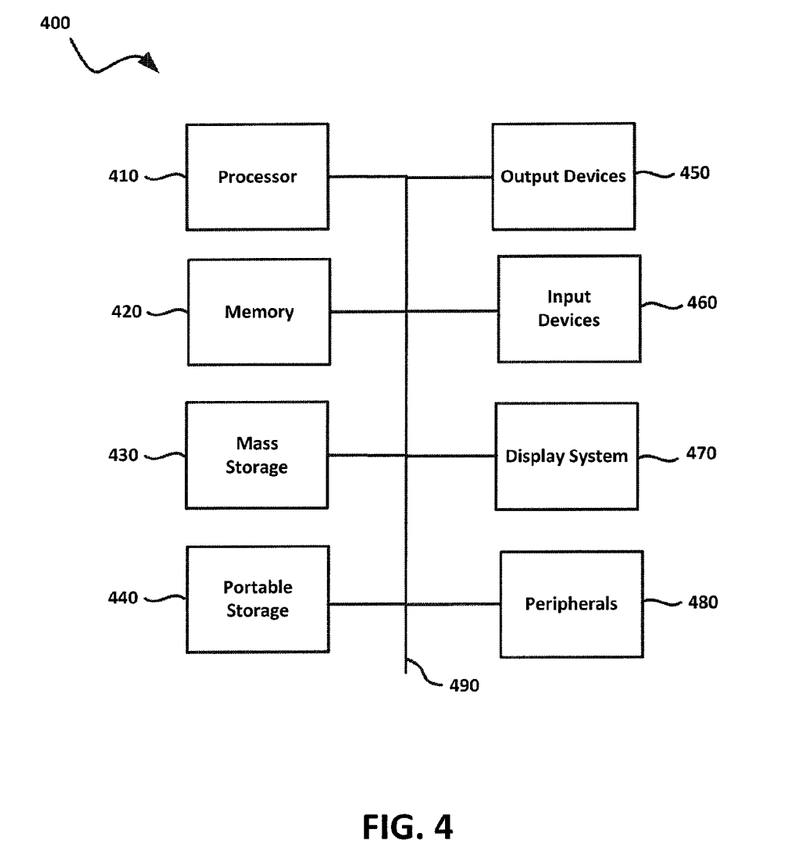
FIG. 4 is a block diagram of an exemplary computing system that may be utilized to practice aspects of the present disclosure.

FIG. 4 illustrates an exemplary computing system 400 that may be used to implement an embodiment of the present technology. The computing system 400 of FIG. 4 includes one or more processors 410 and a main memory 420. Main memory 420 stores, in part, instructions and data for execution by processor 410. Main memory 420 can store the executable code when the system 400 is in operation. The system 400 of FIG. 4 may further include a mass storage device 430, portable storage medium drive(s) 440, output devices 450, user input devices 460, a display system 470, and other peripheral devices 480.

The components shown in FIG. 4 are depicted as being connected via a single bus 490. The components may be connected through one or more data transport means. Processor unit 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present technology for purposes of loading that software into main memory 420.

Portable storage device 440 operates in conjunction with a portable non-volatile storage medium, such as a floppy disk, compact disk or digital video disc, to input and output data and code to and from the computing system 400 of FIG. 4. The system software for implementing embodiments of the present technology may be stored on such a portable medium and input to the computing system 400 via the portable storage device 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computing system. Peripheral device(s) 480 may include a modem or a router.

The components contained in the computing system 400 of FIG. 4 are those typically found in computing systems that may be suitable for use with embodiments of the present technology and are intended to represent a broad category of such computer components that are well known in the art. Thus, the computing system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A method for transparently optimizing a workload of a containment abstraction, comprising:
   determining if an at least partially hardware bound containment abstraction should be converted to an entirely central processing unit (CPU) bound containment abstraction based upon the workload of the at least partially hardware bound containment abstraction;
   converting the at least partially hardware bound containment abstraction to being an entirely (CPU) bound containment abstraction by placing the containment abstraction in a memory store, based upon the workload;
   allocating the workload of the entirely CPU bound containment abstraction across at least a portion of a data center to optimize the workload of the entirely CPU bound containment abstraction; and
   automatically reverting the CPU bound containment abstraction back to being at least partially hardware bound when another containment abstraction having a higher priority is determined to require conversion.

2. The method according to claim 1, wherein a containment abstraction includes any of a virtual computing machine, an application, a program, an operating system virtualization, a virtual environment, a jail, a virtual private server, or any combination thereof.

3. The method according to claim 1, wherein converting includes placing the containment abstraction in a storage object and caching the storage object in the memory store associated with a cloud.

4. The method according to claim 1, further comprising:
   gathering asynchronous data output from the entirely CPU bound containment abstraction; and
   synchronously providing the gathered data to a database associated with the server.

5. The method according to claim 1, wherein determining if an at least partially hardware bound containment abstraction should be converted to an entirely central processing unit (CPU) bound containment abstraction includes determining an eligibility of the least partially hardware bound containment abstraction to be converted.

6. The method according to claim 5, wherein the least partially hardware bound containment abstraction is eligible to be converted when the workload of the containment abstraction exceeds an expected workload for a period of time.

7. The method according to claim 5, wherein the entirely CPU bound containment abstraction is eligible to be reverted back to being at least partially hardware bound when the workload of the containment abstraction falls below expected workload for a period of time.

8. The method according to claim 7, further comprising communicating aggregated asynchronous output of the entirely CPU bound containment abstraction to a data store of the data center upon the occurrence of a reversion event.

9. The method according to claim 1, wherein the data center includes a plurality of servers in a network.

10. The method according to claim 9, wherein determining further includes:
    ranking a plurality of at least partially hardware bound containment abstractions by comparing the workloads of the plurality of at least partially hardware bound containment abstractions to one another; and prioritizing which of the plurality of at least partially hardware bound containment abstractions are to be converted based upon the ranking.

11. The method according to claim 1, further comprising determining an amount of the at least a portion of the data center to which the workload of the entirely CPU bound containment abstraction is allocated based upon the workload of the entirely CPU bound containment abstraction.

12. The method according to claim 1, wherein the entirely CPU bound containment abstraction is distributed across memory stores of a plurality of servers of the data center.

13. A system for transparently optimizing a performance of a containment abstraction, comprising:
   a memory for storing executable instructions for transparently optimizing a performance of a containment abstraction; and
   a processor configured to execute the instructions stored in the memory to:
      determine if an at least partially hardware bound containment abstraction should be converted to an entirely central processing unit (CPU) bound containment abstraction based upon the workload of the at least partially hardware bound containment abstraction, the determination further including:
         ranking a plurality of at least partially hardware bound containment abstractions by comparing the workloads of the plurality of at least partially hardware bound containment abstractions to one another; and
         prioritizing which of the plurality of at least partially hardware bound containment abstractions are to be converted based upon the ranking;
      convert the at least partially hardware bound containment abstraction to being an entirely (CPU) bound containment abstraction by placing the containment abstraction in a memory store, based upon the workload; and
      allocate the workload of the entirely CPU bound containment abstraction across at least a portion of a data center to optimize the workload of the entirely CPU bound containment abstraction, the data center including a plurality of servers in a network.

14. The system according to claim 13, wherein a containment abstraction includes any of a virtual computing machine, an application, a program, an operating system virtualization, a virtual environment, a jail, a virtual private server, or any combination thereof.

15. The system according to claim 13, wherein the processor is further configured to execute the instructions to convert by placing the containment abstraction in a storage object and caching the storage object in the memory store associated with a cloud.

16. The system according to claim 13, wherein the processor is further configured to execute the instructions to:
   gather asynchronous data output from the entirely CPU bound containment abstraction; and
   synchronously provide the gathered data to a database associated with the server.

17. The system according to claim 13, wherein the processor is further configured to execute the instructions to determine if an at least partially hardware bound containment abstraction should be converted to an entirely central processing unit (CPU) bound containment abstraction includes determining an occurrence of a conversion event.

18. The system according to claim 17, wherein the conversion event includes the workload of the containment abstraction exceeding an expected workload for a period of time.

19. The system according to claim 17, wherein the processor is further configured to execute the instructions to revert the entirely CPU bound containment abstraction to being at least partially hardware bound upon the occurrence of a reversion event.

20. The system according to claim 19, wherein the reversion event includes the workload of the containment abstraction falling below an expected workload for a period of time.

21. The system according to claim 19, wherein the processor is further configured to execute the instructions to communicate aggregated asynchronous output of the entirely CPU bound containment abstraction to a data store of the data center upon the occurrence of the reversion event.

22. The system according to claim 13, wherein the processor is further configured to execute the instructions to determine an amount of the at least a portion of the data center to which the workload of the entirely CPU bound containment abstraction is allocated based upon the workload of the entirely CPU bound containment abstraction.

23. The system according to claim 13, wherein the entirely CPU bound containment abstraction is distributed across memory stores of a plurality of servers of the data center.

24. The system according to claim 13, further comprising automatically revert the CPU bound containment abstraction back to being at least partially hardware bound when another containment abstraction having a higher priority is determined to require conversion.

25. A method for transparently converting asynchronous output of a containment abstraction to synchronous output, comprising:
   determining if the asynchronous output of the containment abstraction indicates that the containment abstraction is busy, the containment abstraction being at least partially hardware bound;
   responsive to determining, converting the containment abstraction from being at least partially hardware bound to being entirely central processing unit (CPU) bound by placing the containment abstraction in a memory store;
   aggregating the asynchronous output of the entirely CPU bound containment abstraction;
   synchronously providing the aggregated asynchronous output to a data store; and
   automatically reverting the CPU bound containment abstraction back to being at least partially hardware bound when another containment abstraction having a higher priority is determined to require conversion.

26. A method for transparently optimizing a workload of a containment abstraction, comprising:
   determining if an at least partially hardware bound containment abstraction should be converted to an entirely central processing unit (CPU) bound containment abstraction based upon the workload of the at least partially hardware bound containment abstraction, the determining further including:
      ranking a plurality of at least partially hardware bound containment abstractions by comparing the workloads of the plurality of at least partially hardware bound containment abstractions to one another; and
      prioritizing which of the plurality of at least partially hardware bound containment abstractions are to be converted based upon the ranking;
   placing the at least partially hardware bound containment abstraction into a storage object and moving the storage object to a memory store to convert the at least partially hardware bound containment abstraction to being entirely (CPU) bound containment abstraction, based upon the workload; and arbitraging the workload of the entirely CPU bound containment abstraction to a data center to optimize the workload of the entirely CPU bound containment abstraction, the data center including a plurality of servers in a network.

27. The method according to claim 26, wherein workload includes at least one of a latency and a bandwidth of the containment abstraction.

28. The method according to claim 27, wherein bandwidth includes any of network data communications, disk data communications, memory data communications, and combinations thereof.

* * * * *